United States Patent
Dietrich et al.

[11] Patent Number: 5,836,208
[45] Date of Patent: Nov. 17, 1998

[54] APPARATUS FOR CONVERTING A ROTATIONAL MOVEMENT INTO AN AXIAL MOVEMENT

[75] Inventors: Johannes Dietrich, Gilching; Bernd Gombert, Grafrath, both of Germany

[73] Assignee: Deutsche Forschungsanstalt für Luft-und Raumfahrt e.V., Köln, Germany

[21] Appl. No.: 741,042

[22] Filed: Oct. 30, 1996

[30] Foreign Application Priority Data

Oct. 31, 1995 [DE] Germany .......... 195 40 634.6

[51] Int. Cl.⁶ .......... F16H 25/22
[52] U.S. Cl. .......... 74/424.8 C; 74/89.15; 74/459
[58] Field of Search .......... 74/424.8 C, 459

[56] References Cited

U.S. PATENT DOCUMENTS

| | | | |
|---|---|---|---|
| 2,482,082 | 9/1949 | Wahlberg | 74/424.8 C |
| 4,576,057 | 3/1986 | Saari | 74/89.15 X |
| 4,846,007 | 7/1989 | Weyer | 74/424.8 C X |
| 4,884,466 | 12/1989 | Duruisseau | 74/459 X |
| 4,926,708 | 5/1990 | Dietrich et al. | |
| 5,370,012 | 12/1994 | Stanley | 74/424.8 C X |

FOREIGN PATENT DOCUMENTS

| | | | |
|---|---|---|---|
| 0168942 | 1/1986 | European Pat. Off. | |
| 2065442 | 9/1973 | Germany | |
| 2807952 | 8/1979 | Germany | |
| 283329 | 3/1980 | Germany | |
| 9213640 | 10/1992 | Germany | |
| 387391 | 1/1965 | Switzerland | 74/424.8 C |
| 1744348 A1 | 6/1992 | U.S.S.R. | 74/424.8 C |

*Primary Examiner*—Rodney H. Bonck
*Assistant Examiner*—William C. Joyce
*Attorney, Agent, or Firm*—Browdy and Neimark

[57] ABSTRACT

To convert a rotational movement into an axial movement, rolling or roller bodies (2') are seated by way of a plurality of guide rings (5) and bearings (6) disposed between the guide rings (5) and a spindle nut (3'). The rolling or roller bodies (2') are fixedly spaced relative to the spindle nut (3') and one another, so an axial reception of a force or torque by the spindle nut (3) is transmitted through the rolling and roller bodies (2'), the guide rings (5) and the bearings (6), and, via the rolling or roller bodies (2'), the guide rings (5) and the bearings (6), a rotational movement of the spindle rod (1) is converted into an axial movement of the spindle nut (3'), or vice versa, that is free from pitch errors.

13 Claims, 2 Drawing Sheets

APPARATUS FOR CONVERTING A ROTATIONAL MOVEMENT INTO AN AXIAL MOVEMENT

BACKGROUND OF THE INVENTION

1. Technical Field of the Invention

The invention relates to an apparatus for converting a rotational movement into an axial movement and vice versa.

2. Prior Art

Planetary roller spindles, as illustrated and described in, for example, DE-A-20 65 442 and DE-A-28 38 329, operate with different embodiments including a spindle, roller bodies or rolling bodies and a spindle nut. Threads or grooves, for example, can be cut into the components. In principle, however, the profiling of the roller or rolling bodies extends into the profilings on the side of the spindle and the side of the nut in order to produce an axial force flux. Therefore, matching grooves or threads must be provided on all three components. The nuts and the roller or rolling bodies can likewise only be provided with grooves so that the roller or rolling bodies do not execute an axial movement, while the spindle is configured to have a multiple-turn thread whose number of turns corresponds to the number of rollers, or is a multiple of this number, as described in, for example, DE-A-28 07 952.

An apparatus for converting a rapid rotational movement into a slow axial movement with a substantial gain of force is known from DE 37 39 059 C2. FIGS. 3a and 3b illustrate this process in sectional views, with FIG. 3b showing a sectional view along line III—III in FIG. 3a. FIGS. 3a and 3b show a centrally-disposed spindle rod 1, into which a fine-pitch thread 10 is cut. Disposed in planetary fashion around the spindle rod 1 are, for example, six roller or rolling bodies 2a'' through 2f'', which have a fine grooved profile 21'' that matches the fine-pitch thread 10 of the spindle rod and is correspondingly fine, and comprises adjacent, parallel-extending grooves.

Crude guide grooves 22'' having a V-shaped cross section are further configured in the individual planetary rollers 2a'' through 2f''; these grooves correspond to guide grooves 30'' configured negatively in the inside wall of the spindle nut 3''.

All of the planetary rollers 2'' extend precisely and reliably into both the guide grooves 30'' on the inside wall of the spindle nut 3'', and the fine-pitch thread 10 of the spindle rod 1. The grooved profiling 21'' that corresponds to the fine-pitch thread 10 has a fixedly predefinable pitch distribution or pitch offset on each planetary roller 2'' that remains constant from roller to roller.

A drawback of the above-described apparatuses is the occurrence of pitch errors, which, in robotics, can lead to imprecise positioning of the elements secured to the spindle nut, for example. Pitch errors of this nature result, for example, due to slip or deformation of the thread.

From G 92 13 640.0 a spindle system is known in which pitch errors can be avoided. In this spindle system, planets only extend into the thread on the side of the spindle, not into a thread on the side of the nut. Instead, the individual planets, are seated on pins in the nut by way of ball bearings. The force produced by the rotation of the spindle is thus transmitted to the planets via their thread turns, and from the planets is introduced into the nut via the axial ball bearings. Because the entire force transmission is effected via the ball bearings and the planet shafts, this spindle system cannot be used to transmit large forces.

A further spindle system, in which the planets extend into a thread on the spindle side, but not into a thread on the nut side, is known from EP 0 168 942. Corresponding to the above-described spindle system, the planets are seated in the nut. The seating of the planets by way of corresponding pins is configured as a sliding seating, and not only serves in force transmission, but also in precise positioning of the planets in the nut.

For the transmission of force from the planets to the nut, a ring having an inside thread is disposed between them; the planets extend into this inside thread. The ring is seated in the nut by way of needle bearings, and is thus freely rotatable therein. The force transmission therefore occurs from the planets, via the intermediate ring, to the needle bearings and from the bearings to the nut.

A particular drawback of a spindle system of this type is that the force transmission is effected by way of needle bearings, which possess a high friction and are consequently inefficient. Therefore, this spindle system cannot be used to transmit high rpms.

OBJECT AND SUMMARY OF THE INVENTION

It is therefore the object of the invention to create an apparatus for converting a rotational movement into an axial movement, in which no pitch errors and consequently no imprecise positioning occurs, even with slip, and can be used at high rpms and when large forces are to be transmitted.

In accordance with the invention, this object is accomplished with an apparatus described below for converting a rotational movement into an axial movement and vice versa.

In accordance with a preferred embodiment of the invention, rolling or roller bodies are held in a spindle nut by way of rotatably seated guide rings. Ball bearings or roller bearings which are held, for example, in the spindle nut are provided between the rolling or roller bodies, which keeps the distance between the rolling or roller bodies constant. Accordingly, the roller or rolling bodies do not travel in planetary fashion around the spindle rod, but are seated to be fixed to the housing in the spindle nut.

Thus, relative movement no longer occurs between the rolling or roller bodies disposed in planetary fashion and the spindle nut. As a consequence of the lack of relative movement, pitch errors no longer occur during slip. Thus, in the embodiment of the invention, an axial transmission of force takes place from the thread turns of the spindle rod to the rolling or roller bodies, and from these bodies to the spindle nut via the guide rings.

In this embodiment, the individual roller or rolling bodies are supported by ball bearings or roller bearings that are disposed between the bodies and the spindle nut, and are fixed to the housing. At the same time, the bearings are spaced from one another. The force flux from the rolling or roller bodies to the spindle nut therefore no longer extends as in the prior art described by way of the guide grooves of the rolling or roller bodies and the guide grooves in the spindle nut, as shown in FIG. 3a, for example.

In the solution of the invention, no pitch errors can occur due to slip, because the roller or rolling bodies are guided by way of bearings, or a roller or sliding seating of the guide rings in the spindle nut. Therefore, the overall pitch of the spindle system is only a function of the pitch of the spindle rod.

DETAILED DESCRIPTION OF THE PREFERRED EMBODIMENT(S) OF THE INVENTION

Figure 1:
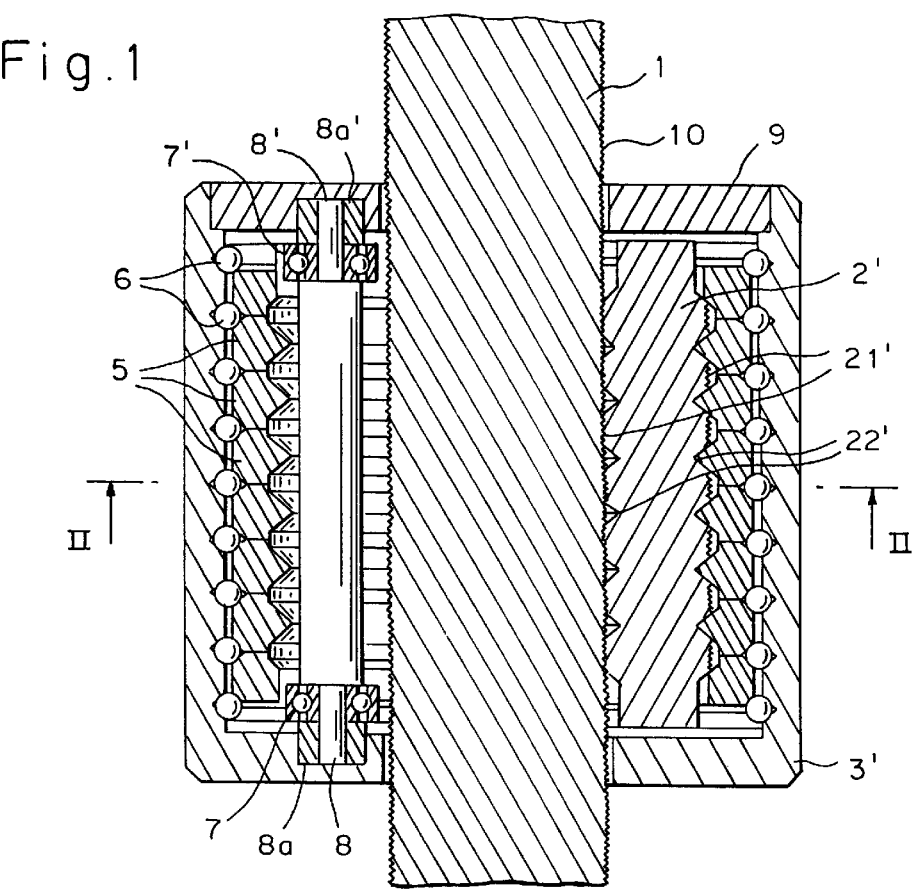
FIG. 1 is an axial sectional view of a preferred embodiment of the apparatus of the invention.
Figure 2:
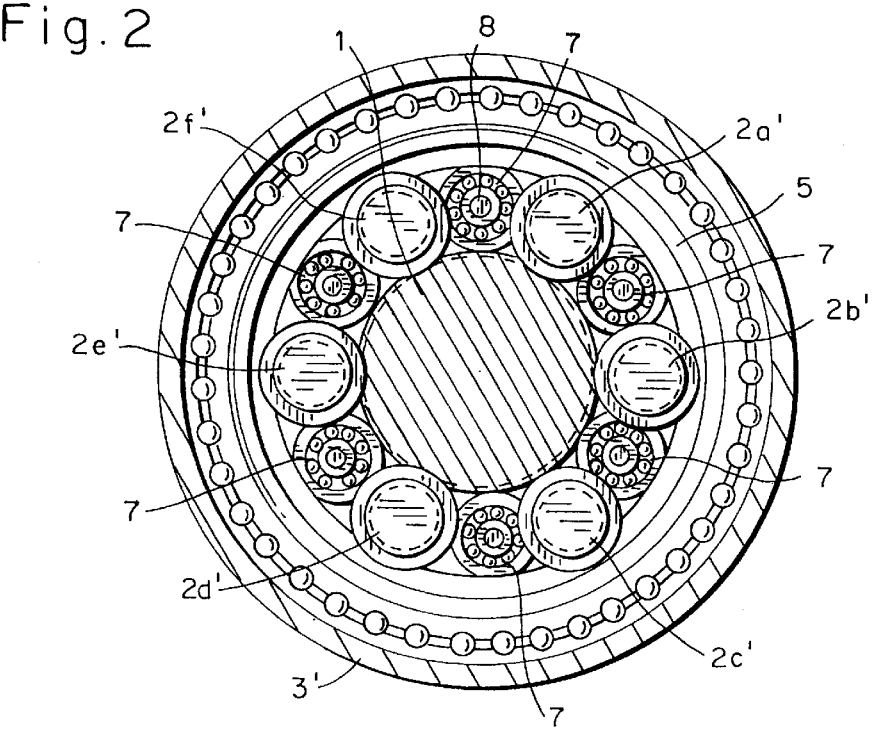
FIG. 2 a sectional view along line II—II of FIG. 1.
Figure 3A:
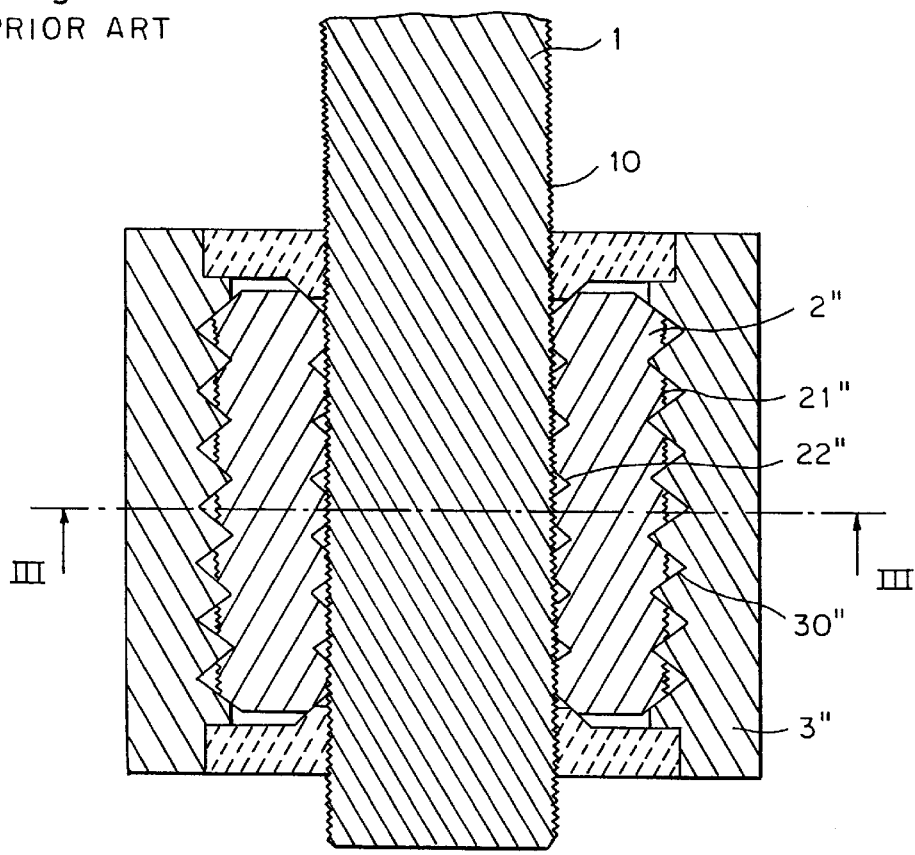
FIGS. 3a and 3b are sectional views in the axial direction, that is, along line III—III of FIG. 3a, of a prior art device for converting a rotational movement into an axial movement.
Figure 3B:
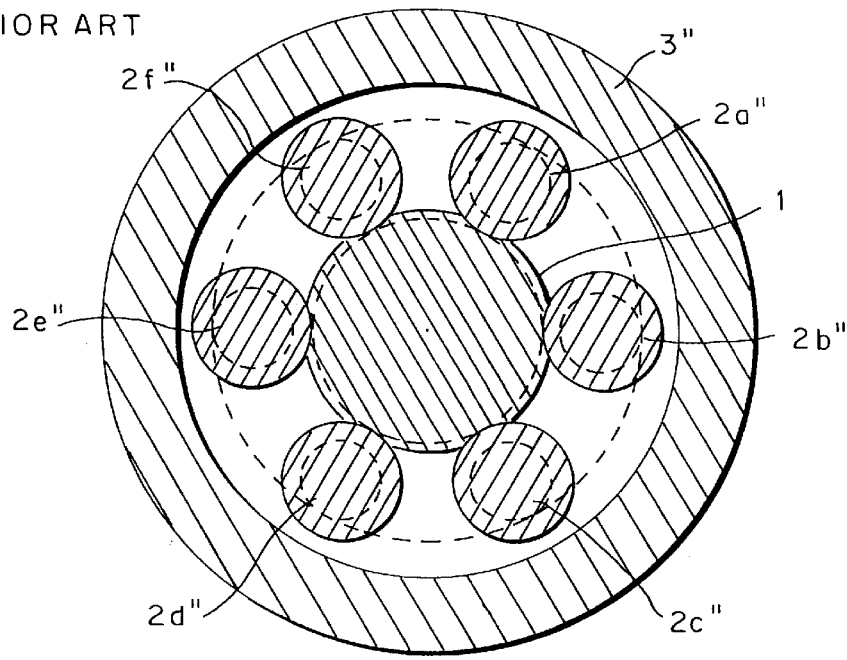

The sectional view in FIG. 1 in the axial direction and the sectional view in FIG. 2 along line II—II of FIG. 1 show a preferred embodiment of the invention. In the center of FIG. 1 is a spindle rod 1 that has a single-turn or multiple-turn, fine-pitch thread 10. Roller or rolling bodies 2', the number of which can be varied, are disposed, in planetary fashion, at uniform intervals around the spindle rod 1. FIG. 2 shows the rollers 2a' through 2f', in this instance numbering six. The roller or rolling bodies 2a' through 2f' are provided with a grooved profiling 21' that corresponds to the fine-pitch thread 10 of the spindle rod.

A force introduced into the spindle rod 1 is transmitted from the single-turn or multiple-turn, fine-pitch thread 10 of the spindle rod to stepped, grooved profiles 21' of a plurality of roller or rolling bodies 2'.

The force is further transmitted by means of sliding contact onto a plurality of guide rings 5 via guide grooves 22' provided in the roller or rolling bodies 2' and having a V-shaped cross section. The guide rings 5 are seated in a spindle nut 3' by way of ball or roller bearing rings 6, so no forces or torques occurring in the direction of the circumference can be transmitted between the guide rings 5 and the spindle nut 3'.

Ball or roller bearings 7 and 7' are provided for the contact seating of the roller or rolling bodies 2a' through 2f', and for maintaining a constant spacing between the roller or rolling bodies 2a' through 2f'. The ball or roller bearings 7 are held directly in the spindle nut 3' by pins 8 and bushings 8a, and the ball or roller bearings 7' located opposite the ball or roller bearings 7 are held in a cover 9 by pins 8' and bushings 8a'.

With the arrangement of the above-described guide rings 5 and the ball or roller bearings 7 and 7', no slip can occur between the fine-pitch thread 10 of the spindle rod 1 and the guide grooves 22' of the roller or rolling bodies 2'. Pitch errors occurring due to slip or for other reasons are also precluded.

What is claimed is:

1. Apparatus for converting a rotational movement into an axial movement or vice versa, the apparatus comprising a spindle rod (1) having a single lead thread (10), a spindle nut (3') that encompasses the rod, and a plurality of rolling or roller bodies (2') disposed between the spindle nut and the spindle rod, each of said plurality of rolling or roller bodies (2') having grooved profiles (21') that match the thread (10) of the spindle rod (1), wherein the rolling or roller bodies (2') are rotatably engaged on the spindle rod and are seated between the spindle rod and a plurality of guide rings (5) and bearings (6) engaged adjacent to the guide rings (5) within the spindle nut (3'), each of said plurality of rolling or roller bodies (2') being fixedly spaced relative to the spindle nut (3') and one another as effected by spacing means in a form of ball or roller bearings (7, 7') rotatably fixed to the spindle nut and spaced apart from the thread of the spindle rod, so that an axial reception of force and torque by the spindle nut (3') is transmitted through the rolling and roller bodies (2'), the guide rings (5) and the bearings (6), and, through the rolling or roller bodies (2'), the guide rings (5) and the bearings (6), a rotational movement of the spindle rod (1) is converted into an axial movement of the spindle nut (3'), or vice versa, that is free from pitch errors.

2. Apparatus according to claim 1, wherein balls are provided as the bearings (6) between the guide rings (5) and the spindle nut (3').

3. Apparatus according to claim 2, wherein in order to receive forces and torques axially, the rolling or roller bodies (2'), in addition to the grooved profiles (21') have guide grooves (22') which have V-shaped cross section and by way of which the force is transmitted to the plurality of guide rings (5) by means of sliding contact.

4. Apparatus according to claim 3, wherein the guide grooves (22') have a greater width than the width of the grooved profiles (21').

5. Apparatus according to claim 3, wherein the guide grooves (22') are parallel.

6. Apparatus according to claim 1, wherein in order to receive forces and torques axially, the rolling or roller bodies (2') have, in addition to the grooved profiles (21') guide grooves (22') which have a V-shaped cross section and by way of which the force is transmitted to the plurality of guide rings (5) by means of sliding contact.

7. Apparatus according to claim 6, wherein the guide grooves (22') have a greater width than the width of the grooved profiles (21').

8. Apparatus according to claim 6, wherein the guide grooves (22') are parallel.

9. Apparatus according to claim 1, wherein in order to receive forces and torques axially, the rolling or roller bodies (2'), in addition to the grooved profiles (21'), have guide grooves (22') which have a V-shaped cross section and by way of which the force is transmitted to the plurality of guide rings (5) by means of sliding contact.

10. Apparatus according to claim 6, wherein the guide grooves (22') have a greater width than the width of the grooved profiles (21').

11. Apparatus according to claim 9, wherein the guide grooves (22') are parallel.

12. Apparatus according to claim 1, wherein the bearings (6) are located between the guide rings (5).

13. Apparatus according to claim 1, wherein the thread (10) and the grooved profiles (21') each are parallel.

* * * * *